Aug. 16, 1949.    H. OSTERBERG    2,479,541
APPARATUS FOR TREATING SURFACES
Original Filed Dec. 29, 1942    6 Sheets-Sheet 1

INVENTOR
HAROLD OSTERBERG
BY
*Raymond A. Paquin*
ATTORNEY

Aug. 16, 1949.     H. OSTERBERG     2,479,541
APPARATUS FOR TREATING SURFACES
Original Filed Dec. 29, 1942     6 Sheets-Sheet 2

Fig. 3.

INVENTOR
HAROLD OSTERBERG
BY
Raymond A. Paquin
ATTORNEY

Aug. 16, 1949. H. OSTERBERG 2,479,541
APPARATUS FOR TREATING SURFACES
Original Filed Dec. 29, 1942 6 Sheets-Sheet 3

INVENTOR
HAROLD OSTERBERG
BY
Raymond A. Paquin
ATTORNEY

Aug. 16, 1949.    H. OSTERBERG    2,479,541
APPARATUS FOR TREATING SURFACES
Original Filed Dec. 29, 1942    6 Sheets-Sheet 4

Fig. 12.

INVENTOR
HAROLD OSTERBERG
BY
Raymond A. Paquin
ATTORNEY

Aug. 16, 1949.　　　　H. OSTERBERG　　　　2,479,541
APPARATUS FOR TREATING SURFACES
Original Filed Dec. 29, 1942　　　　　　　　6 Sheets-Sheet 5

Fig. 13.

INVENTOR
HAROLD OSTERBERG
BY
Raymond A. Paquin
ATTORNEY

Aug. 16, 1949.   H. OSTERBERG   2,479,541
APPARATUS FOR TREATING SURFACES
Original Filed Dec. 29, 1942   6 Sheets-Sheet 6

Fig. 14.

INVENTOR
HAROLD OSTERBERG
BY
ATTORNEY

Patented Aug. 16, 1949

2,479,541

UNITED STATES PATENT OFFICE 2,479,541

APPARATUS FOR TREATING SURFACES

Harold Osterberg, Buffalo, N. Y., assignor, by mesne assignments, to American Optical Company, Southbridge, Mass., a voluntary association Original application December 29, 1942, Serial No. 470,489. Divided and this application August 30, 1943, Serial No. 500,527

8 Claims. (Cl. 219—19)

This invention relates to a new and improved coated article and to new and improved processes and apparatus for producing the same.

This application is a division of my application Serial Number 470,489, filed December 29, 1942.

One of the principal objects of the invention is to provide articles with surface coatings which may be cleaned repeatedly with no substantial damage.

Another object of the invention is to provide a new and improved method and apparatus for providing more durable and wear resisting reflection reduction coatings to the surfaces of articles.

Another object of the invention is to provide an article having a durable, wear resistant reflection reduction coating thereon.

Another object of the invention is to provide a new and improved method and apparatus for treating or coating the surfaces of light reflecting or transmitting articles so as to substantially reduce the light reflectance thereof and which coatings may be formed as hard and durable as the uncoated surface of such article especially in the case of the softer glasses such as medium flint or barium crown glasses.

Another object of the invention is to provide a light transmitting or light reflecting article having a coating on a surface thereof adapted to substantially reduce the light reflectivity of said surface and which coating may be formed more wear resistant than known prior art coatings.

Another object of the invention is to provide new and improved means and method for vaporizing the coating material and increasing the speed of motion of the vaporized particles to provide greater cohesion of the coatings of the articles being coated.

Another object of the invention is to provide a new and improved apparatus for forming coatings of the type set forth.

Another object is to provide means for controlling the direction of motion of the particles and of the coating material to control the deposition of the coating material on the areas desired.

Other objects and advantages of the invention will be apparent from the following description taken in connection with the accompanying drawings. It will be understood that the details of construction, arrangement of parts of the apparatus and steps of the process may be changed without departing from the scope of the invention as expressed in the accompanying claims. I therefore, do not wish to be limited to the exact details of construction, arrangement of parts and steps of the process shown and described as the preferred forms have been given by way of illustration only.

Referring to the drawings.

For some time past there has been considerable interest shown and effort expended in providing the surfaces of articles with protective coatings and also providing the surfaces of light reflective or light transmitting articles such as optical elements, for example, lenses, prisms, windows, etc., with coatings which reduce or substantially eliminate the light reflectance of such surfaces and thereby considerably increase the light transmission of said articles.

While such coatings have been successful in substantially reducing or eliminating the light reflectance of the surface of such articles and thereby increasing the light transmission of said articles it has not been possible by prior methods and apparatus for depositing the coating material to form such coatings to obtain coatings having the durability and wear resistance of the uncoated article and it has even been extremely difficult to make them sufficiently durable and wear resistant to withstand usual handling and cleaning of said surfaces and therefore it was necessary that articles having such coatings on the surfaces thereof be handled delicately to prevent injury thereto. This was particularly so in the case of optical instruments or the like where it was necessary to clean or to remove dust from said coated surfaces and during such cleaning operation frequently the coating was damaged requiring the removal of said coating and the placing of a new coating on said surface which was both expensive and troublesome.

It is therefore an object of this invention to provide a surface coating which will be substantially permanent and more durable and wear resistant than has been possible in the past.

Figure 1:
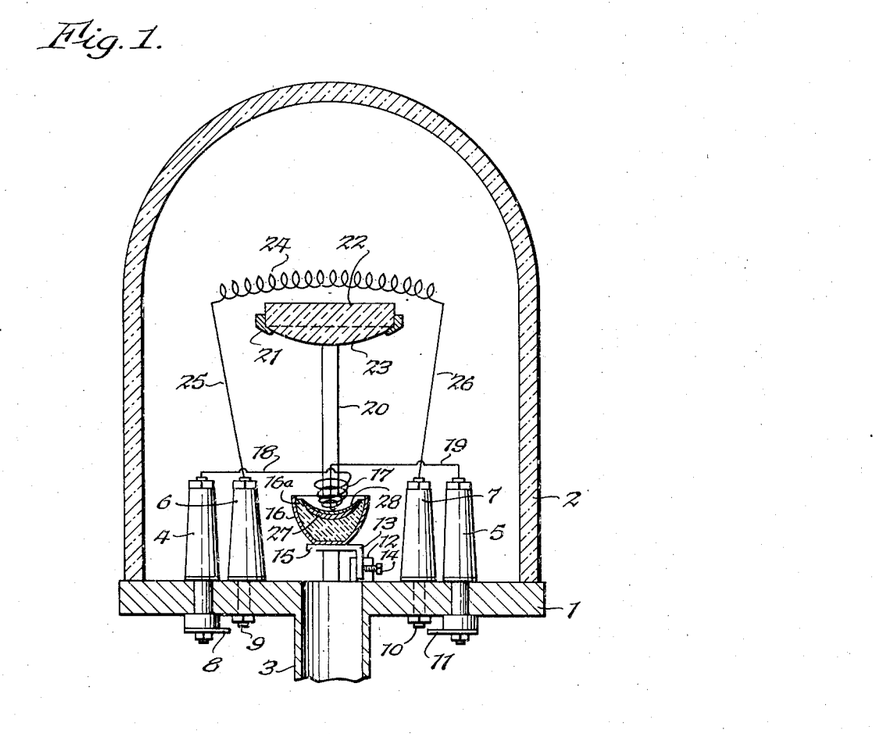
Fig. 1 is a sectional view of an apparatus constructed according to my invention.

Referring more particularly to the drawings wherein similar reference characters designate corresponding parts throughout the several views, the apparatus for coating articles according to this invention shown in Fig. 1 comprises the base 1 on which is positioned the bell jar or the like 2 to form a vacuum chamber member.

The base 1 is provided with an opening which is connected by a pipe 3 to a high vacuum or diffusion pump for evacuating the said vacuum chamber. Also extending through said base 1 are two pairs of electrodes 4 and 5 and 6 and 7 respectively, which electrodes are adapted to receive current through the contacts 8, 11, 9 and 10 respectively to supply current within the vacuum chamber as hereinafter described.

Within the vacuum chamber and in desired location therein is provided the support 12 having an opening therein in which is adjustably positioned, the supporting member 13 which support is adapted to be locked in desired adjusted position by the set screw or the like 14.

The supporting member 13 has the offset portion 15 formed integral therewith or secured to the said portion 13 by suitable means to support the crucible 16 in desired adjusted position relative to the heating coil 17.

The heating coil 17 is connected to a current supply through the leads 18 and 19 which are secured adjacent their ends to their respective electrodes 4 and 5.

Also on said base 1 is positioned the upright support or the like 20 having the holding member 21 adapted to hold the optical element or other article to be coated 22 in position relative to said crucible so that the lower surface 23 of said article 22 may be coated by vaporized particles which are deposited on the surface 23 of said article 22. Over the article 22 is positioned the heating coil or heater 24 adapted to receive current through the leads 25 and 26 from the electrodes 6 and 7 respectively and adapted to heat the article to be coated in the vacuum prior to the coating thereof or both prior to and after the coating thereof as described in my copending application, Serial Number 440,778 filed April 28, 1942.

In the crucible support 16 is placed the insulating and supporting material 16a for supporting the crucible 27 on the upper surface of said insulating and supporting material 16a and which material both supports the coating material and acts as a radiation shield therefor, thereby preventing heat loss during the vaporization of said material. This material 16a may be in powdered or fused form as described hereinafter or other suitable material to perform the functions set forth above.

The crucible member 27 is preferably formed of carbon or graphite although it may be formed of tungsten, platinum or other heat conducting material for conducting heat to the coating material 28 which may be placed on said crucible member 27 in powdered form or in the form of a prefused pellet as desired.

Figures 7, 8, 9, 10, 11:
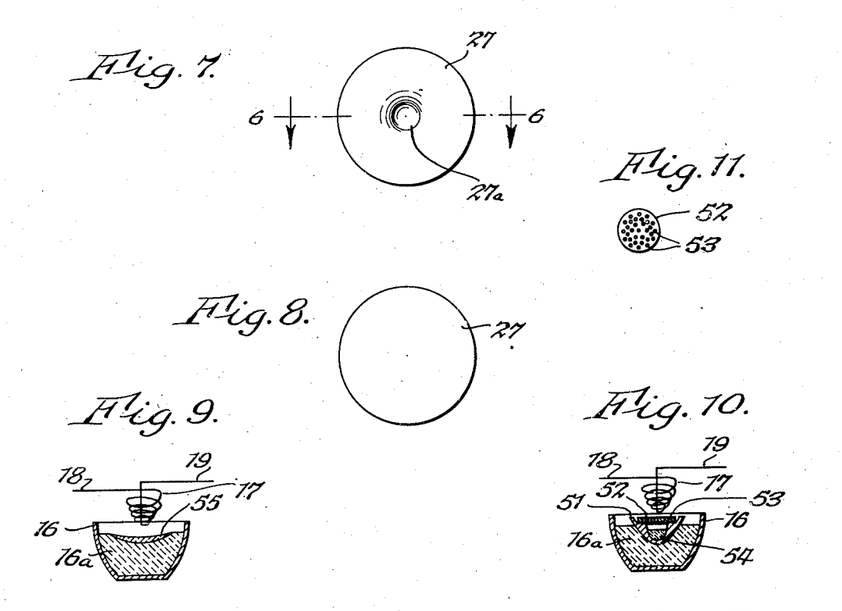
Fig. 7 is a top or plan view of another form of crucible member.
Fig. 8 is a top or plan view of still another form of crucible member.
Fig. 9 is a sectional view of another crucible arrangement.
Fig. 10 is a sectional view, similar to Fig. 9, but showing another form of crucible arrangement.
Fig. 11 is a top or plan view of the cap member employed by the crucible member shown in Fig. 10.

The coating material 28 comprises the material of which the coating on the surface 23 of the article 22 is to be formed. This coating material may be magnesium fluoride, quartz, cryolite, lithium fluoride, calcium fluoride or other suitable material for forming said coating and may be placed on said crucible member 27 in finely ground or powdered form or may be prefused into a ball as shown in Fig. 7.

Also the coating may be aluminum or the like where the article to be coated is to form a mirror or reflector.

Figure 3:
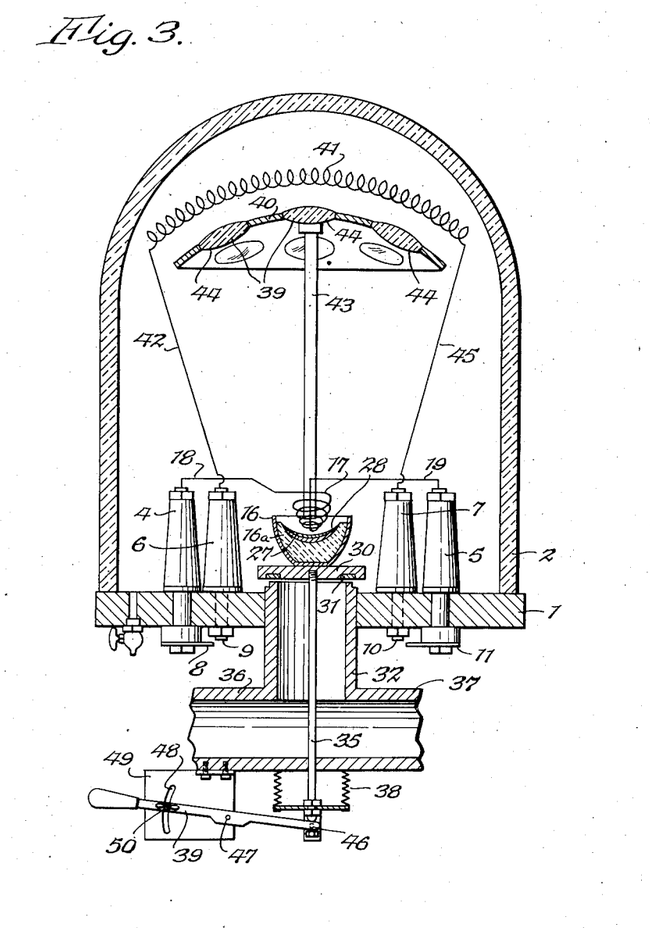
Fig. 3 is a view similar to Fig. 1 but showing another form of apparatus.

Below said crucible 27 in the crucible support 16 as shown in Figs. 1 and 3, is placed a quantity of an insulating and supporting material 16a. This material may be varied according to the coating material to be employed, for example, if the coating material 28 is to be magnesium fluoride or quartz then said insulating and supporting material may be of similar material. Or, if the material 28 is magnesium fluoride then said insulating and supporting material may be either magnesium fluoride or quartz or if said coating material 28 is quartz then said insulating and supporting material may be of quartz or another insulating material of higher melting point than quartz as desired. It is essential that this insulating and supporting material have a melting point which is at least as high as the melting point of the coating material 28 so that said supporting material will not be markedly disturbed by the heat during the vaporizing of said coating material 28.

It is pointed out that this insulating and supporting material 16a acts as a support for the crucible 27 and also as an insulation and radiation shield therefor.

As also shown in Figs. 1 and 3 the coating material 28 is positioned on or over the crucible member 27. This crucible member may be of various contours and shapes, some of which are shown in Figs. 4 to 11 inclusive.

Figure 4:
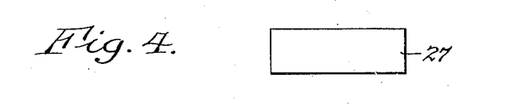
Fig. 4 is a top or plan view of one form of crucible member.
Figure 5:
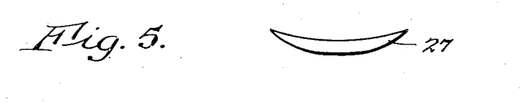
Fig. 5 is a side view of the crucible member shown in Fig. 4.
Figure 6:
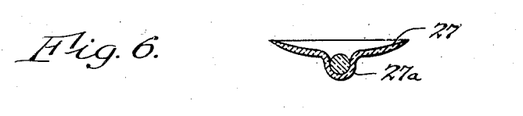
Fig. 6 is a sectional view taken on line 6—6 of Fig. 7 looking in the direction of the arrows.

Figs. 4 and 5 show a strip form crucible member while Figs. 6 and 7 show a circular crucible member having a depressed central portion 27a adapted to contain the coating material while Fig. 6 shows a circular crucible member having a disk shaped cross section such as shown in Fig. 5.

Fig. 9 shows a construction generally similar to that shown in Figs. 1 and 3 but instead of using the crucible member 27 as shown in said Figs. 1 and 3, the coating material 55 is mixed with carbon or graphite particles which mixture may be in powdered form or prefused as shown in Fig. 6 and may be placed directly on the insulating or radiation shield body 16a which may be of powdered or fused form as stated above or said mixture 55 may be placed on any of the forms of crucible shown.

It is pointed out that this crucible member 27 may be of any other desired contour such as square, oval or other desired contour and also may be formed of various cross sections but preferably has a dished or depressed central portion adapted to contain the coating material.

Also this strip or crucible member 27 is preferably formed of a material adapted to absorb the heat rays such as graphite or a carbonaceous material so that the heat radiating from the heating coil 17 is received by the said strip or crucible member 27 which absorbs said heat and conducts or reradiates the same to said coating material 28. The said coating material 28 may be comprised of magnesium fluoride or quartz or other material as described above or may be comprised of any of said materials having finely ground graphite of carbonaceous material of a high degree of purity fused or mixed therewith so that the heat absorbed by said crucible member 27 will be better conducted or reradiated to said particles of graphite or carbon which are in thermal contact with the coating material and which therefore will readily conduct the heat to said coating material.

In Fig. 10 is shown a further form of crucible member 51 having the cover member 52 which is provided with a series of openings 53 therethrough to allow the vaporized particles to reach the surface of the article to be coated. In this form the coating material 54 may consist of the coating material alone, or be combined with the powdered carbon or graphite and in powdered or prefused form as described above.

In Fig. 3 is shown an arrangement comprising the base 1 with the bell jar thereon forming a vacuum chamber and containing the crucibles and electrodes previously described in connection with the form of the invention shown in Fig. 1.

The apparatus shown in Fig. 3 differs from that shown in Fig. 1, in that in the apparatus of Fig. 3 an arrangement is shown whereby the position of the crucible 27 and crucible support 16 relative to the heating coil 17 may be controlled and varied from without the vacuum chamber and during the operation of the apparatus whereas with the construction shown in Fig. 1, the position of the crucible relative to said heating coil 17 may be adjusted only from within the vacuum chamber and therefore only when the apparatus is not in operation.

In this form the upright 43 supports the curved support or plate 40 which is centered relative to the coating material 28 and which plate is adapted to support the articles or elements 39, the surfaces 44 of which are to be coated and the heating coil 41 is positioned over said support 40 and elements 39 and preferably in substantially concentric relation therewith and the leads 42 and 45 from said heating coil are connected to the electrodes 6 and 7 respectively and are adapted to receive current therefrom.

In the base 1 is an opening in which is fitted pipe member 32 having the portions 36 and 37 thereof connected with diffusion or other high vacuum pumps to exhaust the vacuum chamber.

Over the upper end of said member 32 which extends into the vacuum chamber is positioned the cover member 30 having the inset portion 31 of rubber or the like adapted to fit over and engage the upper end of said member 32 and seal said opening if desired.

A control rod 35 for said cover 30 has one end connected to said cover member 30 and has its opposite end extending through the lower end of the exhaust member where there is provided the flexible bellows 38 of a type such as known commercially as Sylphon bellows and said rod 35 has its lower end connected at 46 to an end of the pivoted lever 39 which has a handle for pivotal adjustment of said lever. This lever 39 is pivotally connected at 47 to the plate 49 and has an opening therethrough adapted to be aligned with the arcuate slot 48 in said plate 49 and a bolt is provided through said slot member 48 and through said opening in said lever 39 and a wing nut or the like 50 is provided for locking said lever 39 in adjusted relation to said plate 49 to lock said rod 35 and said cap member 30 in adjusted position and thereby lock said crucible support 16 and crucible 27 in adjusted position relative to said heating coil 17. It will be seen that with this construction, that by adjusting the lever 39 as previously described that the cover 30 and crucible support 16 which is positioned on said cover 30 may be raised or lowered to proper position to retain said crucible member and heating coil in said adjusted relation. The cover 30 may be brought into sealing contact with the pipe 32 to permit the bell 2 to be removed without losing the vacuum in the line. With this construction it will also be noted that the relative positions of said heating coil 17 and crucible member 27 may be varied during the coating operation, thus allowing the adjustment of the crucible member to compensate for any variations in the position of the coating material in the crucible upon the heating of the same.

Figure 12:
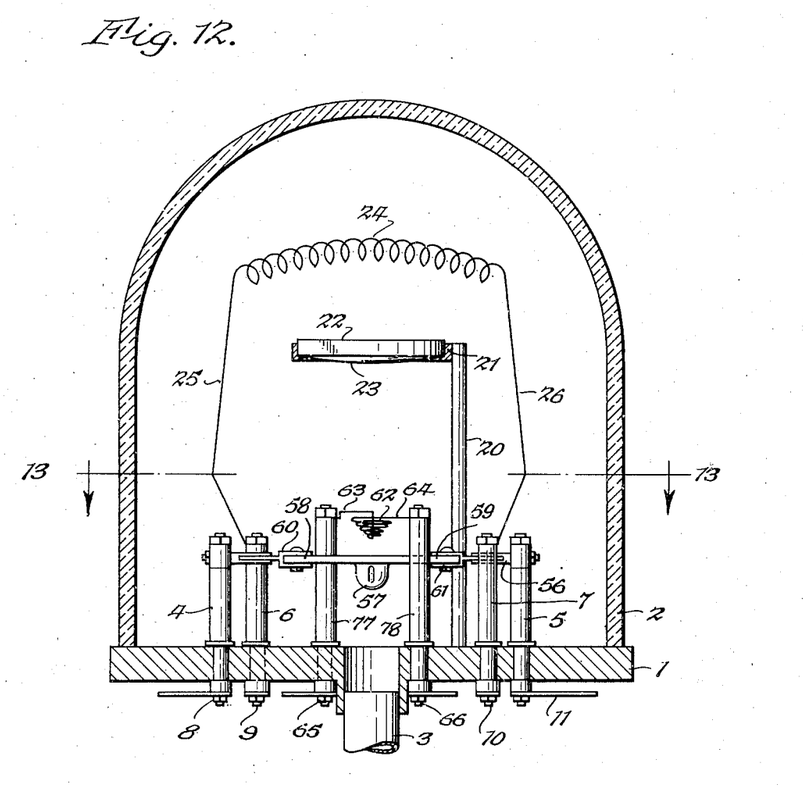
Fig. 12 is a view similar to Figs. 1 and 3 but showing another form of apparatus.
Figure 13:
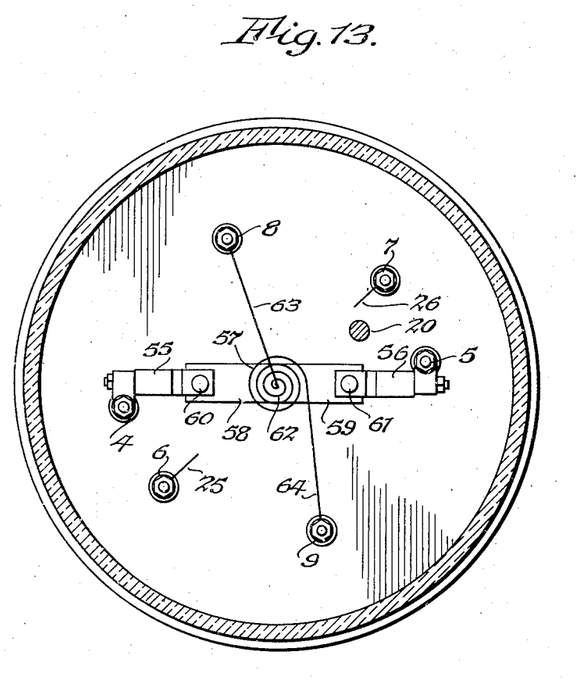
Fig. 13 is a sectional view of the apparatus shown in Fig. 12 and taken on line 13—13 of Fig. 12 looking in the direction of the arrows.

The apparatus shown in Figs. 12 and 13 is generally similar to the apparatus shown in Fig. 1 in that it contains the base 1 and bell jar or the like 2 forming the vacuum chamber as well as the upright support 30 and support member 21 for supporting the article 25 having the surface 23 to be coated.

This apparatus employs three sets or pairs of electrodes, 4 and 5 6 and 7 and 77 and 78 respectively. The electrodes 4 and 5 have the contacts 8 and 11 respectively and said electrodes are adapted to supply current to the crucible member 57 which is preferably formed of carbonaceous material such as set forth in my application Serial Number 421,632 filed December 4, 1941 now Patent No. 2,337,679. The said crucible 57 is provided with the integral contact portions 58 and 59 which are connected to the connecting members 60 and 61 respectively which connecting members are secured to the clamp members 55 and 56 which in turn are connected to their respective electrodes 4 and 5. The said crucible member 57 is adapted to contain the material of which the coating is to be formed, such as magnesium fluoride, quartz, etc. as described above and to receive current through the electrodes 4 and 5 as previously described to vaporize said coating material by resistance heating.

The electrodes 6 and 7, having the contacts 9 and 10 respectively, supply current through the leads 25 and 26 to the heating coil 24 as previously described.

In this form of apparatus an additional pair of electrodes 77 and 78 having the contacts 65 and 66 respectively are provided to supply current through the leads 63 and 64 respectively to the heat coil 62 preferably of tungsten wire. This heating coil both supplies additional heat by radiation to the coating material to assist in vaporizing said material and acts as an accelerator or supercharger, that is, as the vaporized particles of the coating material on rising from the crucible 57 and approach, touch or collide with the wires forming the coil 62 the heat from or temperature of said coil 62 considerably accelerates or increases the speed or velocity of a considerable portion of the particles of coating material thereby causing said articles to hit the surface 23 to be coated with considerably greater force or impact than would be the case without the use of said coil 62. This action tends to cause said particles to adhere more firmly to said surface 23 and produces a very marked increase in the adhesion of the evaporated coat. Moreover there is a tendency when boiling material in crucible 57 for bubbles to break and throw off unvaporized particles of globules which are vaporized in passing coil 62. This prevents marring of the coated surface by preventing the depositing of globules thereon.

Generally, the adhesion of the coating material is increased by increasing the velocity of the evaporated particles or molecules. In order that the coil 62 will increase the yield of these particles or molecules, it is necessary that the temperature of this coil be higher than that of the crucible. In the evaporation of magnesium fluoride the temperature of the crucible 57 is approximately 1700° C. Since the temperature of the tungsten coil 62 may be raised to 3100° C., very marked increases in velocity are brought about for those vaporized particles or molecules which approach or collide with the coil. Corresponding increases in adhesion of the evaporated films or coatings are then noted provided the vacuum pressure is sufficiently low. On the other hand, we have noted that the adhesion of the evaporated coat is reduced when the coil 62 is maintained at a temperature below that of the crucible. The possible increase in velocity of and hence adhesion of the vaporized particles or molecules is greatest for coating substances with low melting or boiling points. Thus with lithium fluoride the evaporating temperature is in the neighborhood of 1100° C. so that a 2000° C. temperature difference can be established between the crucible 57 and the accelerating coil or body 62.

The number of particles whose speed is increased is in turn increased by constructing an accelerating coil 62 of tighter windings than shown. The angular distribution of the particles which leave the accelerator coil 62 in the direction of the surface 23 is of importance and may be varied by the choice of shape or size of the coil 62.

It is pointed out that coil 62 is preferably of such size that the base of the coil is at least as large as the crucible containing the coating material, although by reducing the size or area of said coil it would be possible to have the speed or velocity of central area of the vaporized particles increased while not increasing the speed or velocity of the outer portions of the vaporized particles and thus the central area of the coated surface may be made harder than the outer area thereof.

Figure 14:
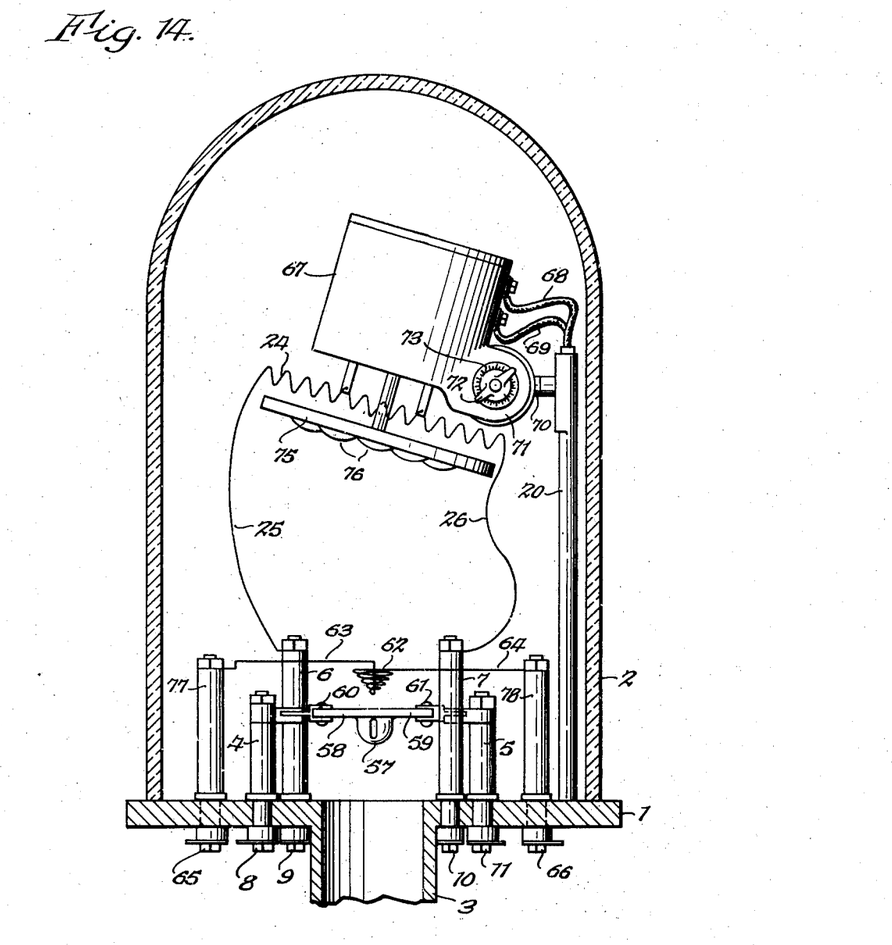
Fig. 14 is a view similar to Fig. 12 but showing a further modified form of apparatus.

It is also pointed out that a second coil similar to the coil 17 may be positioned above the coil 17 in Figs. 1 and 3 and that said second coil would act to increase the velocity of the particles in a manner similar to coil 62 in Figs. 12 and 14. Also in the forms shown in Figs. 12 to 14 inclusive a coil such as 17 may be employed to vaporize the coating material by radiated heat instead of the resistance heating in a crucible such as shown in those figures.

The above is a thermal method for increasing the speed of the vaporized particles or molecules. Another method that may be employed for increasing the speed of the vaporized particles or molecules is to ionize or electrically charge these particles and then send them through an electrical field.

The apparatus shown in Fig. 14 is generally similar to the apparatus of Figs. 12 and 13 except that a modified arrangement for supporting the articles during the coating is shown. This arrangement contains a motor 67 adapted to receive current through the leads 68 and 69. The offset portion 71 of the motor housing 67 is pivotally mounted on an arm 70 which is connected to the upright support 20 adjacent the upper end of said support. This allows the motor casing to be adjusted to desired angular relation with the source of coating material in the crucible 57 to control the distribution of the coating material on the surfaces 76 of the articles to be coated as described in the copending applications of Osterberg, Pride and Luneburg Serial Number 390,428 filed April 25, 1941 now Patent No. 2,351,536 and Serial Number 433,422 filed March 5, 1942 now Patent No. 2,351,537.

The said motor housing is adjustably connected to the said arm 70 by means of the wing nut 72 which may be loosened to allow the angular relation of said housing and said source of coating material to be varied and then said nut 72 is tightened to lock said members in adjusted relation.

The arm 70 is also preferably rotatably connected to the upright 20 to allow adjustment of said motor housing in a direction at right angles to the direction of adjustment allowed by the pivotal connection controlled by the nut 72. This allows practically universal adjustment of said motor housing and the articles to be coated.

The protractor or scale 73 is provided to allow setting of said housing in proper predetermined angular position. A similar protractor may be provided on the upper end of the upright to allow adjustment of said housing in predetermined angular position.

On the end of the shaft 74 of the motor is the support 75 adapted to support the article or articles to be coated with the surfaces 76 to be coated in the direction of the source of coating material.

With this apparatus the article or articles to be coated are rotated by the motor in predetermined angular relation with the source of coating material in order to control the distribution of the coating material. The angular position of said support 75 may be determined as disclosed in the copending applications referred to above.

In carrying out the method of this invention with the apparatus of Fig. 1, the article 22, the surface 23 of which is to be coated, first has said surface 23 which is to receive the vaporized coating material cleaned with suitable cleaning solutions and then said article is placed in the holder 21 with its said surface 23 in a direction toward the said crucible support 16.

In the crucible support 16 is placed the insulating and supporting material 16a. This material 16a may be magnesium fluoride or other material as described above, depending upon the coating material employed, and the crucible member 27 is then placed thereon and the coating material 28 is then placed therein or thereover. This coating material 28 may be mixed with a suitable amount of finely ground carbon or the like and such mixture may be placed on the crucible member 27 or directly on the insulating material 16a. This carbon material is preferably in powdered form which is mixed with the coating material of which the coating is to be formed. The proportions of said carbon and said coating material may be varied as desired but I have found that by mixing 40% of carbon or graphite with 60% of a coating material such as magnesium fluoride that a coating having the desired hardness and wear resistant properties may be obtained. This composition may be varied within a very wide range so long as the percentage of graphite or carbon is high enough to absorb considerable heat from the heating coil to facilitate the vaporization of the coating material.

The vacuum chamber is then evacuated by means of the high vacuum or diffusion pumps and forepumps through the opening 3 until the vacuum chamber is evacuated to a desired degree and then current is applied through the electrodes 6 and 7 to the heating coil 24 to heat the article prior to the coating operation. The article may be then heated in the vacuum to a temperature from 75 degrees centigrade to 300 degrees centigrade for a period of 200 to 20 minutes with the longer heating time using the lower temperatures.

I have found that by heating the article in a vacuum to 200 degrees centigrade for at least 15 minutes to one hour and preferably one hour that when such articles were then coated by the method of this application permanent, wear resistant coatings were obtained. After the article is heated as described above, the current is then applied through the leads 8 and 11 and electrodes 4 and 5 respectively to the heating coil 17, the heat from which is radiated to said coating material 28 and crucible or slip member 27 and said crucible member 27 absorbs said heat and conducts the same to said coating material 28. If the finely ground graphite or carbon is mixed with the coating material 28 as described above, then said carbon or graphite particles also absorb said radiated heat from said coil 17 and conduct the same to the coating material.

When the coating material is sufficiently heated, the particles thereof are vaporized and pass upwards through the coil 17 and are deposited upon the surface 23 of the article 22 and when a coating of sufficient thickness is obtained the current supply to the heating coil 17 is turned off.

It it preferable that the heating coil 24 be energized during the coating operation and the said coil also may be allowed to heat the article after the coating thereof and the coil 17 has been deenergized but this is not absolutely necessary as long as said article is heated prior to the coating operation, as described above.

If the apparatus shown in Fig. 3 is employed the position of the crucible support 16 and coating material 28 relative to said heating coil 17 may be varied during the coating operation by raising or lowering the lever 39 as previously described. I have found that when the coating is applied by the method and apparatus described above that said coating will be permanent and durable and in fact substantially as durable and wear resistant as un-coated surfaces of articles.

It is pointed out that if desired any of the crucible forms shown in Figs. 4 to 11 inclusive may be employed with any of the forms of apparatus shown.

In using the apparatus shown in Figs. 12, 13 and 14 the vacuum chamber is evacuated and the article to be coated is heated by the heating coil 24 as described above. The current is applied to the crucible 57 and coil 62 as also described above. The heating of the crucible 57 vaporizes the coating material which may or may not be mixed with powdered carbon or graphite and the said vaporized coating material then rises upwardly through the heated coil 62 which increases the speed of said particles as herein before described. In this case the coil 62 also provides additional heat for aiding in vaporizing the coating material.

It is particularly pointed out that by preheating the surface to be coated in a vacuum and then providing the heat conducting means disclosed durable, wear resisting coats will be obtained and that by further providing means for increasing the speed of the vaporized particles, wear resistant coatings can be obtained.

I have found that where the coatings are formed by the process of this application from material such as magnesium fluoride that the resultant coating may be made harder than the inherent hardness of the magnesium fluoride and such coatings may be formed actually harder than many optical glasses such as medium flint or barium crown glasses of which the optical elements may be formed.

Also, it will be seen that by employing the above process of using a proper coating material that a coating may be formed on the surface of an article which coating is in fact harder and more wear resistant than would be the uncoated surface of said article.

Figure 2:
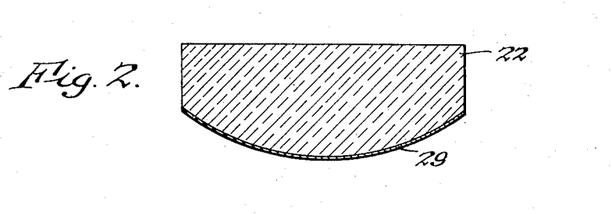
Fig. 2 is a sectional view showing an article treated according to my invention.

In Fig. 2 is shown an article having the coating 29 thereon formed of the coating material in the crucible support 16. I have found that by forming the coating 29 by the apparatus and method herein described that said coating may be formed of a permanent and wear resistant material and substantially as durable and wear resistant as the surface of similar uncoated optical elements.

From the foregoing it will be seen that I have provided simple, efficient and economical means and method for obtaining all of the objects and advantages of the invention.

Having described my invention, I claim:

1. Apparatus for vacuum distillation of coating material comprising a vacuum chamber, means therein for supporting the coating material which is to be distilled, means for supporting an article in position where it is exposed to the vaporized coating material, a source of radiant heat arranged for subjecting the coating material to radiant heat to vaporize said material, and a heat absorbing refractory in heat conducting relation with said material for absorbing radiant heat from said source and conducting it to said material, said refractory being a relatively good absorber of radiant heat.

2. Apparatus for vacuum distillation of coating material according to claim 1 which has heating means for heating the article to be coated.

3. Apparatus for vacuum distillation of coating material comprising a vacuum chamber, means for supporting within said chamber an article which is to be exposed to the vaporized coating material, a refractory container for the coating material, and a source of radiant heat arranged for subjecting said container together with the coating material to radiant heat to vaporize said material, said container being of refractory material which is a relatively good absorber of radiant heat.

4. Apparatus for vacuum distillation of coating material according to claim 3 in which the container for the coating material is supported on a bed of refractory insulating material.

5. Apparatus for vacuum distillation of coating material according to claim 3 in which the relative positions of said refractory container and said heat source may be adjusted to increase or decrease the amount of radiant heat applied to said container and material.

6. Apparatus for coating an article comprising a vacuum chamber, a refractory crucible for containing the material used for coating, a source of radiant heat arranged for subjecting said crucible and its contents to radiant heat, said crucible being of refractory material which is a relatively good absorbent of radiant heat, said crucible having a container portion for receiving thereon the coating material and a contiguous portion of substantially greater surface area than said container portion directly exposed to said radiant heat source, and supporting means for an article arranged within said chamber to expose said article to the vaporized coating material.

7. Apparatus for coating an article according to claim 6 which includes a bed of refractory insulating material for supporting said crucible.

8. Apparatus for coating an article, including a vacuum chamber, a supply of coating material therein, and means for vaporizing said coating material comprising a source of radiant heat arranged for subjecting the surface of said coating material to radiant heat, and means for simultaneously conducting to said coating material additional heat in an amount sufficient to raise the temperature of the surface of said material exposed to said radiant heat, said last named means including a comminuted refractory material intermixed with the coating material, said refractory material being more absorptive of radiant heat than the coating material.

HAROLD OSTERBERG.

REFERENCES CITED

The following references are of record in the file of this patent:

UNITED STATES PATENTS

| Number | Name | Date |
| --- | --- | --- |
| 402,416 | Dewey | Apr. 30, 1889 |
| 1,345,696 | Richardson | July 6, 1920 |
| 1,490,435 | Sackett | Apr. 15, 1924 |
| 1,903,547 | Kelly | Apr. 11, 1933 |
| 2,025,898 | Rhodes | Dec. 31, 1935 |
| 2,100,045 | Alexander | Nov. 23, 1937 |
| 2,152,934 | Trent | Apr. 4, 1939 |
| 2,160,981 | O'Brien | June 6, 1939 |
| 2,164,595 | Siebertz | July 4, 1939 |
| 2,237,328 | Birdseye et al. | Apr. 8, 1941 |
| 2,288,788 | Clark | July 7, 1942 |
| 2,301,456 | Sabine | Nov. 10, 1942 |
| 2,318,533 | Selvig | May 4, 1943 |

FOREIGN PATENTS

| Number | Country | Date |
| --- | --- | --- |
| 483,029 | Great Britain | Apr. 11, 1938 |

OTHER REFERENCES

Beese, J. Optical Soc. of A., vol. 31, pages 706–8 (1944).